US008740252B2

(12) United States Patent
Reichelsheimer et al.

(10) Patent No.: US 8,740,252 B2
(45) Date of Patent: Jun. 3, 2014

(54) LABEL STOCK FOR THERMAL PRINTER

(75) Inventors: Jay Reichelsheimer, Shelton, CT (US); David L. Rich, Shelton, CT (US); Steven M. Kaye, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 1976 days.

(21) Appl. No.: 11/018,707

(22) Filed: Dec. 21, 2004

(65) Prior Publication Data

US 2006/0136347 A1 Jun. 22, 2006

(51) Int. Cl.

| | |
|---|---|
| ***G09F 3/00*** | (2006.01) |
| ***B42D 15/00*** | (2006.01) |
| ***G06K 19/06*** | (2006.01) |
| ***G06K 9/00*** | (2006.01) |

(52) U.S. Cl.

USPC ............... 283/71; 283/92; 283/103; 283/105; 283/81; 235/491; 382/101

(58) Field of Classification Search

USPC ................ 283/71, 81, 92, 103, 105; 235/491; 101/484; 705/408; 382/101

See application file for complete search history.

(56) References Cited

U.S. PATENT DOCUMENTS

| | | | | |
|---|---|---|---|---|
| 5,135,569 | A * | 8/1992 | Mathias | 106/31.32 |
| 5,573,277 | A * | 11/1996 | Petkovsek | 283/79 |
| 6,176,908 | B1 * | 1/2001 | Bauer et al. | 106/31.15 |
| 6,962,371 | B1 * | 11/2005 | Petkovsek | 283/81 |
| 2002/0103764 | A1 | 8/2002 | Yen et al. | |
| 2003/0223800 | A1 * | 12/2003 | Wiklof et al. | 400/621 |
| 2004/0070194 | A1 * | 4/2004 | Janetzke et al. | 283/71 |
| 2005/0170127 | A1 * | 8/2005 | Whitmond et al. | 428/42.3 |
| 2005/0280686 | A1 * | 12/2005 | Bernhard et al. | 347/105 |

FOREIGN PATENT DOCUMENTS

WO 9966456 12/1999

OTHER PUBLICATIONS

Direct Thermal vs. Thermal Transfer http://web.archive.org/web/20031024001334/http://www.internationalpointofsale.com/directvsthermal.html.*

* cited by examiner

*Primary Examiner* — Kyle Grabowski

(74) *Attorney, Agent, or Firm* — Steven J. Shapiro; Charles R. Malandra, Jr.

(57) ABSTRACT

Labels that may selectively provide signaling are shown. In one example, a fluorescent signaling section of a label may be perforated and may be mechanically removed from the main portion of the label to selectively provide a label that does not emit a fluorescent signal. In another example, a thermal printer is used to quench a fluorescent section of a label so that it does not emit a fluorescent signal.

18 Claims, 5 Drawing Sheets

LABEL STOCK FOR THERMAL PRINTER

BACKGROUND

The illustrative embodiments described in the present application are useful for labels and in systems including those using thermal printer label stock and more particularly are useful for signaling thermal media labels and in systems including those for providing a signaling thermal label stock for use with postage indicia printers that may also be adapted for non-signaling use.

Many countries have governmental, quasi-governmental or private mail organizations that provide for the processing and delivery of mail. In a typical postal authority system, automated processing and sorting equipment is utilized in mail processing centers to provide for efficient processing and delivery of the mail. Such automated equipment must often correctly orient the mail so that address information, postage payment evidencing information and other related information could be scanned and read.

Accordingly, postal services such as the United States Postal Service (USPS) utilize equipment such as facing equipment to correctly orient the mail piece. The equipment may also decide to divert certain mail pieces so that the evidence of postage payment may be cancelled such as by printing a cancellation image over a stamp to prevent its reuse. In the United States, several alternative methods of payment evidencing are permitted including denominated postage stamps, postage meter indicia and permit mail. Accordingly, several different facing/canceling processes have been developed for use in one or more mail processing streams.

Postage stamps are coated with a green phosphorescent material that may be detected by facer/canceller equipment. The facer equipment will typically use the green phosphorescent properties of the stamp or stamps to identify the front/top/right of the mail piece to enable proper orientation. It will then divert the mail piece for stamp cancellation. The canceller will cancel the stamp or stamps such as by printing a black cancellation image over the stamps to prevent their reuse.

Postage meter indicia may be printed using approved red fluorescent ink. If a red fluorescent ink is used, the facer can use the red fluorescent properties of that ink to identify the front/top/right of the mail piece to enable proper orientation. The system will not typically cancel a meter indicia as there are other mechanisms to prevent reuse. Postage meters may also use a non-fluorescent black ink. However, mail pieces having such non-fluorescent indicia use a barcode known as a Facing Identifier Mark (FIM) for orientation.

Permit mail is typically presorted and inducted into the mail stream at an advanced stage such that it does not travel through the facer/canceller systems used in the sorting process. However, the return user inducts certain permit mail. For example, mail pieces such as such as Business Reply Mail (BRM) postcards will be inducted in the normal mail stream at a post box or post office window. Accordingly, such mail pieces will include a FIM so that the facer/canceller equipment may properly process them. Accordingly, the facer equipment is designed to accommodate several facing process alternatives.

The DM SERIES of mailing machine available from Pitney Bowes Inc. of Stamford Connecticut include postage meters that incorporate digital printing technology. The DM SERIES systems use ink jet printing systems that print postage indicia directly on mail pieces or on labels that may be applied to mail pieces. The indicia may be printed with red fluorescent ink jet ink to meet the USPS facer/canceller requirements. For first-class letter-sized mail pieces, the USPS requires that the user not mix different forms of postage on a single mail piece. For example, mail pieces including indicia printed with fluorescent ink or on labels with fluorescence, and mail pieces including indicia that include a facing identification mark (FIM) are each treated differently in the facing and cancellation process.

Ink jet inks are utilized in several mailing machines and postage meters available from Pitney Bowes of Stamford, Conn. Additionally, ink jet inks have been described in U.S. patents including U.S. Pat. No. 5,091,006, issued Feb. 25, 1992 to Sarada, et al., U.S. Pat. No. 5,290,348, issued Mar. 1,1994 to Auslander, U.S. Pat. No. 5,681,381, issued Oct. 28,1997 to Auslander, et al., and U.S. Pat. No. 6,284,027, issued Sep. 4, 2001 to Auslander, et al. which are hereby incorporated by reference in their entirety. Additionally, certain mailing machines and postage meters have used certain thermal printing techniques. For example, U.S. Pat. No. 5,393,148 issued Feb. 28,1995 to Berson describes an apparatus using a thermal ribbon and is incorporated herein by reference.

Such facing compatible systems must be used only in the front/top/right corner of a mail piece so that proper orientation may be achieved in the mail piece processing equipment. The prior art does not provide a thermal label stock that may be selective used for signaling and thus used for both indicia regions and non-indicia regions of a mail piece.

SUMMARY

Accordingly, it is an object of the present application to describe systems and methods for providing and/or using thermal media stock that can be selectively provided with an indicator. The illustrative embodiments of the present application describe several illustrative alternatives to provide thermal media stock having a selectable indicator.

For example, in one illustrative embodiment, a thermal media label stock includes a first portion having a fluorescent coating and a second portion without such fluorescent coating. The two portions may be separated for use such as by separation along a perforation.

In another illustrative embodiment, a thermal media label stock includes a first portion having a fluorescent coating that may be quenched using a thermal printer.

In yet another illustrative embodiment, a thermal media label stock includes a fluorescent portion having a fluorescent coating that may be quenched by using the thermal printer at a first intensity over a background portion of the fluorescent portion and at a second intensity over a printing portion of the fluorescent portion such that there is sufficient contrast to read the printing portion on the background portion.

Therefore, it should now be apparent that the invention substantially achieves all the above aspects and advantages. Additional aspects and advantages of the invention will be set forth in the description that follows. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

Illustrative systems and methods for providing and using thermal media stock that can be selectively provided with an indicator are described. In a postage indicia printer using thermal printing techniques, a roll of thermal media labels may be used for printing indicia. In an alternative, the labels may be perforated to provide the option of a short length label or a long length label.

Illustrative signaling blank labels including thermal media with fluorescent portions are described in U.S. patent application Ser. No. 10/873,887, entitled Signaling Blank Label and filed Jun. 22, 2004, by Auslander, et al. ("Auslander '887"), which is hereby incorporated by reference in its entirety. Auslander '887 teaches several illustrative thermal labels having fluorescent coatings along with information regarding the fluorescent properties of the labels after they have been printed using a thermal printer. Additionally, information regarding fluorescent properties of a facing system reading such labels is provided. Each illustrative embodiment described herein may utilize one or more of the labels described in Auslander '887 as further modified as described herein.

Figure 1:
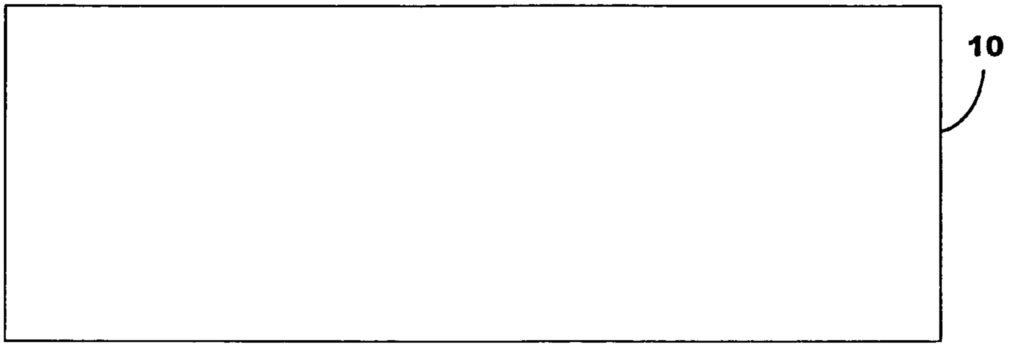
FIG. 1 is a top plan view of a blank thermal media label according to an illustrative embodiment of the present application.

Referring to FIG. 1, an illustrative thermal media label is shown that may be used to print a postage indicia and/or custom image. The labels 10 comprise a modified Mitsubishi K615-ce direct thermal media having a signaling section such as a coating of a taggant material such as a luminescent material. The labels 10 and may be pre-cut to have a standard length such as 2.6 inches. Alternatively, the label stock may be continuous and may be cut to the appropriate length or torn off the roll after the printing process. In another alternative, 2.6-inch pre-cut labels may be further perforated so that two label halves may be separately utilized. In yet another embodiment, a thermal media label roll may include 1.3 inch labels that may be used two at a time to create an aggregated 2.6 inch long label or one at a time to utilize only a 1.3 inch long label. The label may include a pre-formed image or a pre-printed image on the blank label stock. The thermal printer used is a dedicated thermal printer having a specialized controller processor for indicia printing. Non-indicia images and/or text for printing may be downloaded to the thermal printer for storage or may be obtained in real-time or near real-time from a connected host processor such as a personal computer using a USB port. However, a generic thermal printer may also be utilized with a generic print driver in the embodiments of the present application if a host processor is programmed to provide the logic functions described herein. In the embodiments described, a 32 level gray scale thermal printer having 300 dpi is utilized. However, other thermal printers may be used.

Figure 2A:
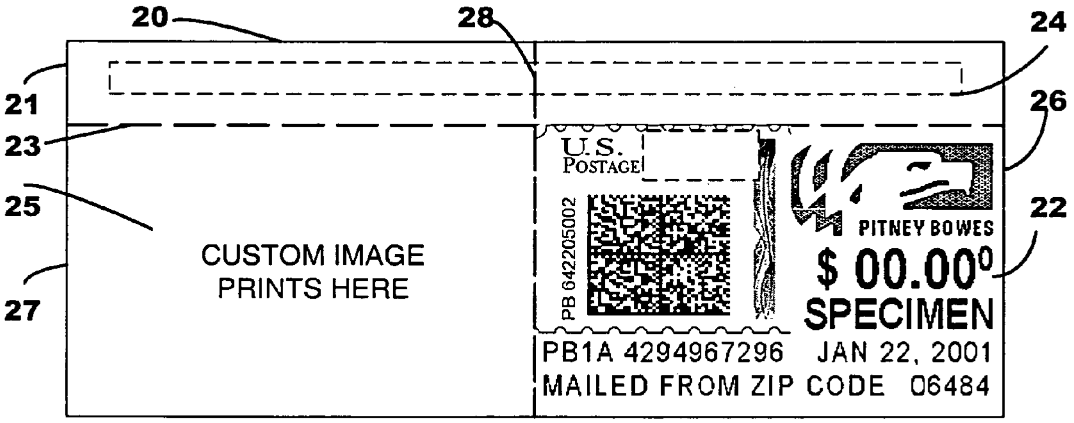
FIGS. 2A and 2B are top plan views of signaling thermal label media according to another illustrative embodiment of the present application.
Figure 2B:
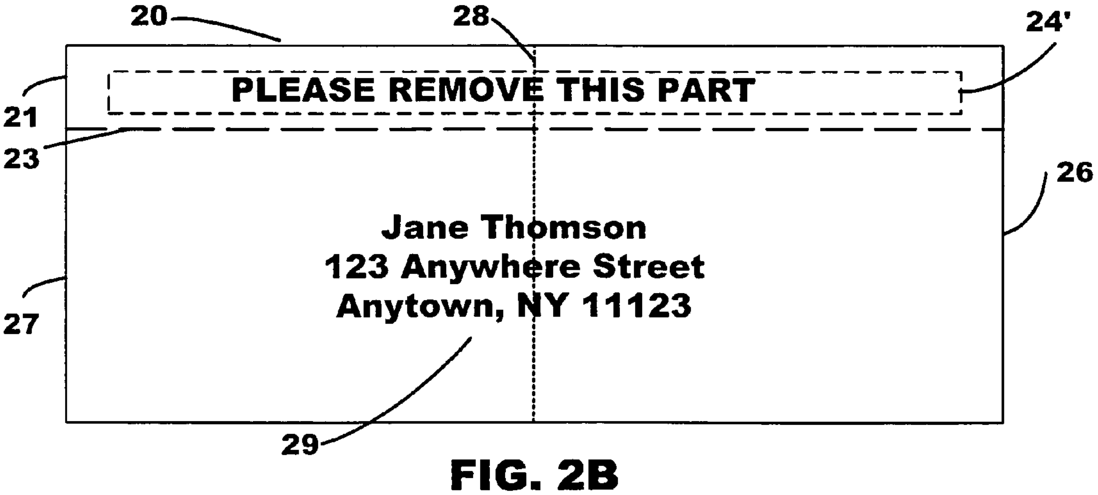

Referring to FIGS. 2A and 2B, a selectively signaling thermal label media according to another illustrative embodiment of the present application is shown. Label 20 is divided vertically by perforation 28 into a left half 27 and a right half 26. The label 20 is also divided horizontally by perforation 23 into a top portion 21 and a bottom portion 26, 27. The top portion 21 includes a signaling region 24 that includes a fluorescent coating. Referring to FIG. 2A, the bottom portion of the right half includes a postage indicia 22. The bottom portion of the left half 27 includes space for a custom image to be printed. Referring to FIG. 2B, the indicia printer determines that a non-indicia label is to be printed and determines that fluorescent signaling should be removed. Accordingly, the thermal printer prints a human readable text message to the user in fluorescent section 24' to prompt the user to remove top section 21. The printer prints an address label or other non-indicia image in the lower portion of the label 26, 27. Accordingly, when the user removes the top section 21, the label has been selectively changed to a non-signaling label that will not interfere with the facer/canceller equipment used by the USPS. In at least one embodiment, the top section 21 is 20% of the width of the label. The upper and lower sections together form a main section of the label for use in the system. The thermal lable media may comprise polypropylene substrate and the fluorescent coating may include an invisible red fluorescent ink.

Figure 3A:
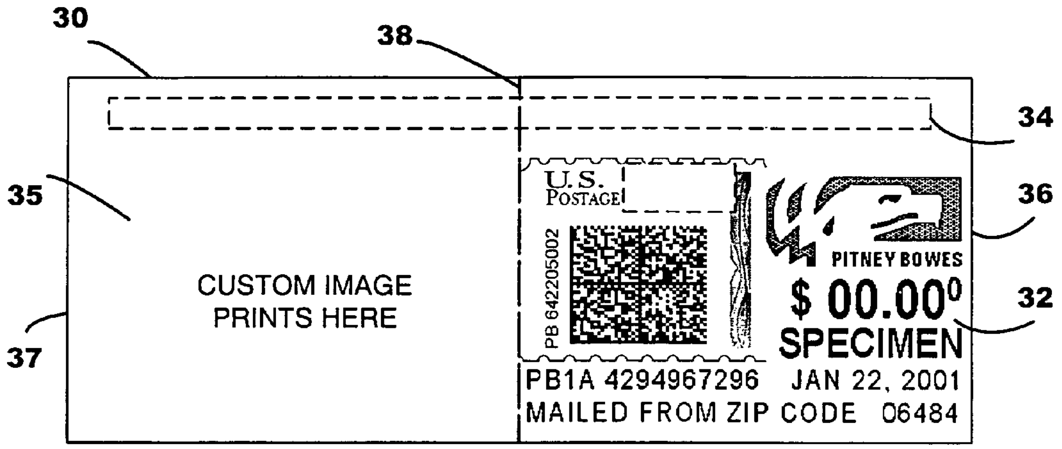
FIGS. 3A and 3B are top plan views of signaling thermal label media according to yet another illustrative embodiment of the present application.
Figure 3B:
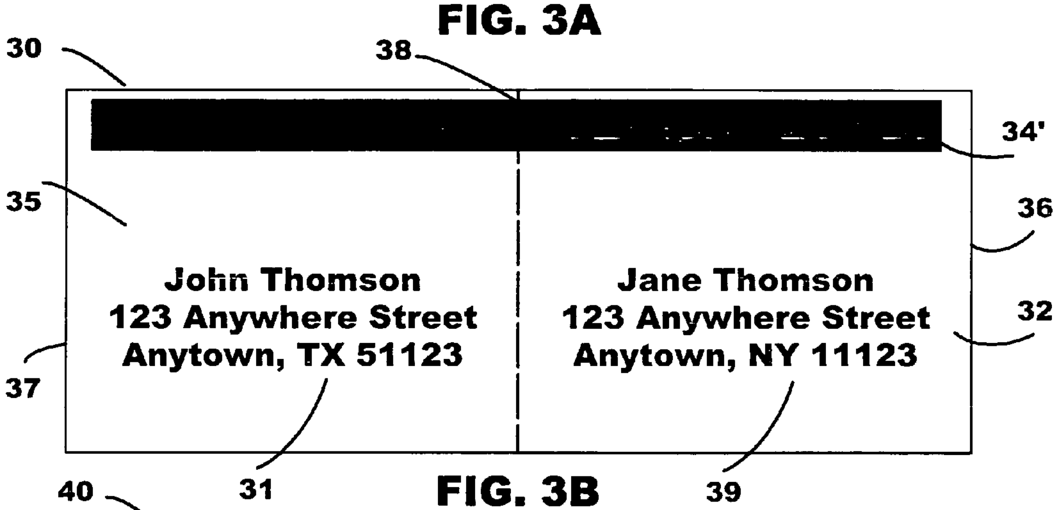

Referring to FIGS. 3A and 3B, a selectively signaling thermal label media according to another illustrative embodiment of the present application is shown. Label 30 is divided vertically by perforation 38 into a left half 37 and a right half 36. The top portion of the label 30 includes a signaling region 34 that includes a fluorescent coating. Referring to FIG. 3A, the bottom portion of the right half includes a postage indicia 32. The bottom portion of the left half 37 includes space 35 for a custom image to be printed. Referring to FIG. 3B, the indicia printer determines that a non-indicia label is to be printed and determines that fluorescent signaling should be removed. Accordingly, the thermal printer prints a quench strip 34' over the fluorescent indicating portion 34. The printer prints an address label or other non-indicia image 31, 39 in each of the lower portions of the label 36, 37. Accordingly, when the user places the address labels 31, 39 on the mail piece, those labels will not provide a fluorescent signal and will not interfere with the facer/canceller equipment used by the USPS. Accordingly, an alternative selectively signaling label is provided. In one embodiment, the quench strip is printed at the complete black level of the gray scale printer. In an alternative, a lesser gray value that provides sufficient quenching is utilized such as 50% gray. The black background quench strip would absorb the UV activation light and the fluorescent emission. The remaining fluorescent strip would be well below the USPS delectability limits for the facer/canceller system and thus would not interfere with the USPS facing operation. The energy required to quench the fluorescence is tailored based upon the initial fluorescence, thermal sensitivity of the paper, and the energy supplied by the thermal printer.

Figure 4:
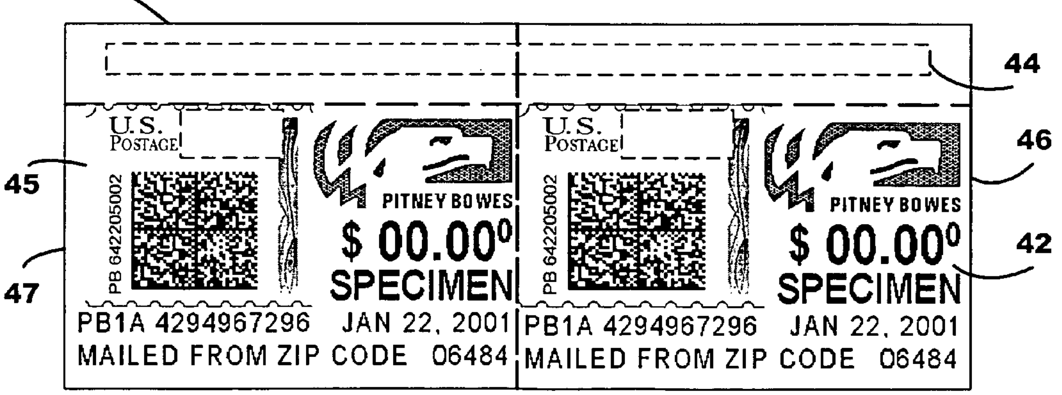
FIG. 4 is a top plan view of two signaling thermal media labels according to another illustrative embodiment of the present application.

Referring to FIG. 4, an illustrative thermal media label is shown that may be used to print two postage indicia according to another embodiment of the present application. The label 40 Is vertically perforated by perforation 48. A fluorescent signaling strip 44 provides fluorescent signaling for both label halves. Left half 47 includes indicia 45 and right half 46 includes indicia 42.

Figure 5A:
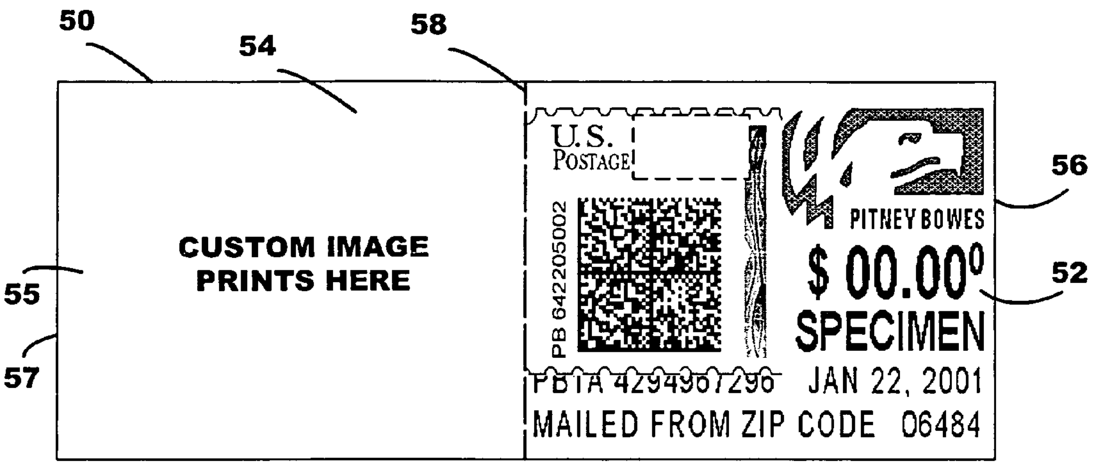
FIGS. 5A and 5B are top plan views of signaling thermal label media according to another illustrative embodiment of the present application.
Figure 5B:
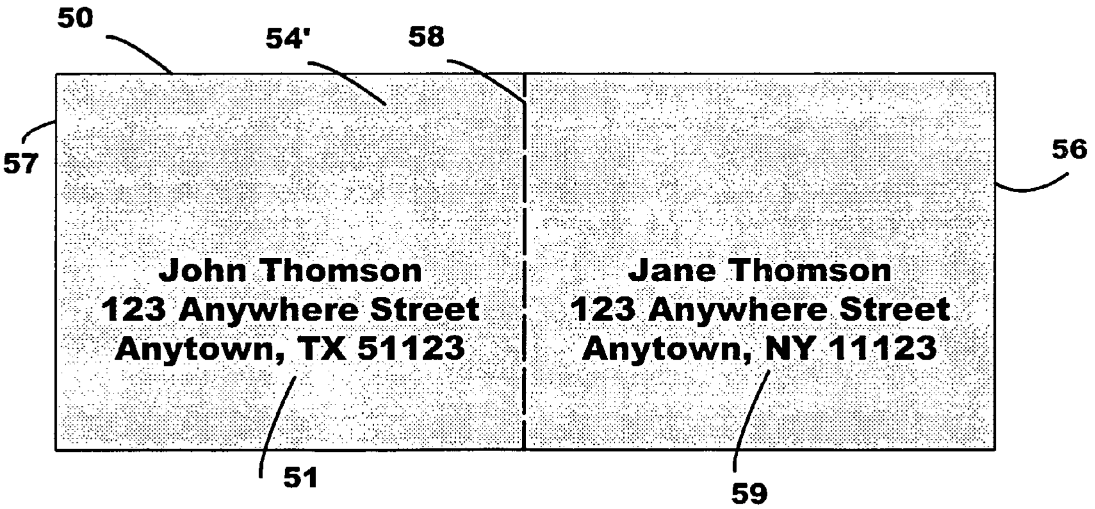

Referring to FIGS. 5A and 5B, a selectively signaling thermal label media according to yet another illustrative embodiment of the present application is shown. Label 50 is divided vertically by perforation 58 into a left half 57 and a right half 56. The entire label 50 includes a signaling region 54 that includes a fluorescent coating. In the present embodiment, the label does not require space for a top section. Referring to FIG. 5A, the right half 56 includes a postage indicia 52. The left half 57 includes space 55 for a custom image to be printed. Referring to FIG. 5B, the indicia printer determines that a non-indicia label is to be printed and determines that fluorescent signaling should be removed. Accordingly, the thermal printer prints a quench pattern 54' over the entire label to quench the fluorescent indicating portion 54. The printer also prints an address label or other non-indicia image 51, 59 in each of the lower portions of the label 56, 77. The printer prints the gray background quench pattern 54' at a first intensity and then prints the address or other non-indicia image 51, 59 at a second intensity to provide sufficient contrast. In one illustrative example, 50% gray is used for the background and the text is printed in black. Accordingly, when the user places the address labels 51, 59 on the mail piece, those labels will not provide a fluorescent signal and will not interfere with the facer/canceller equipment used by the USPS. Accordingly, an alternative selectively signaling label is provided. In another alternative, the fluorescent coating only partially covers label 50. The gray background quench pattern would absorb the UV activation light and the fluorescent emission. The remaining fluorescent pattern. would be well below the USPS delectability limits for the facer/canceller system and thus would not interfere with the USPS facing operation.

Figure 6:
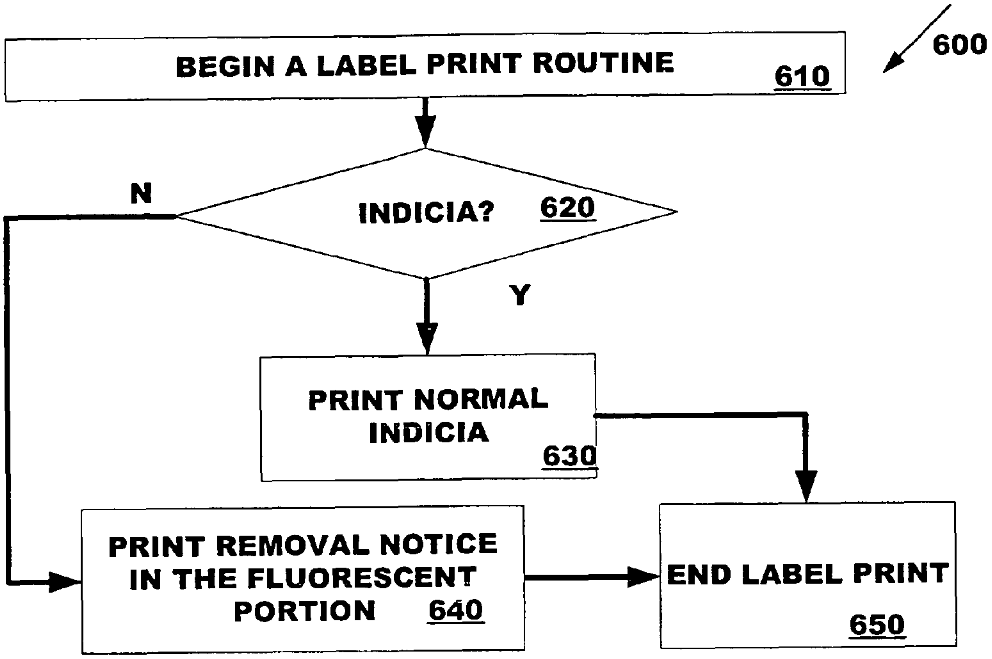
FIG. 6 is a flow chart showing a process for printing indicia and non-indicia labels according to an illustrative embodiment of the present application.

Referring to FIG. 6 is a flow chart showing a process 600 for printing indicia and non-indicia labels according to the illustrative embodiment of the present application shown in FIGS. 2A and 2B. In step 610, the dedicated indicia thermal printing system processor begins a label print routine. In step 620, the processor determines whether an indicia label is to be printed. If so, the processor prints a normal indicia in step 630 and then ends the print label routine. If a non-indicia label is to be printed, the process proceeds to step 640 to print the non-indicia label text/image and the removal notice in the indicating area. The process then concludes the print label routine.

Figure 7:
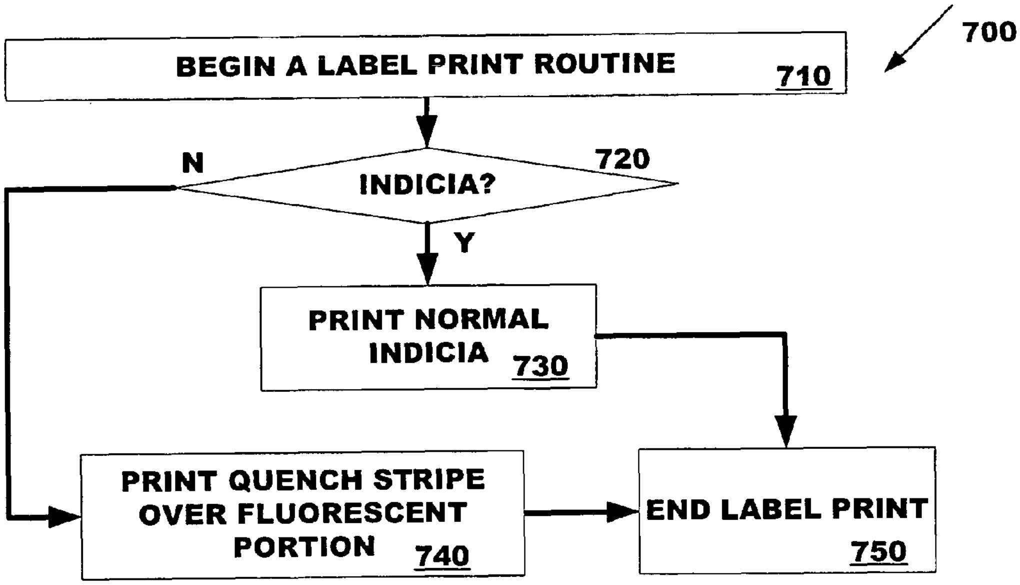
FIG. 7 is a flow chart showing a process for printing indicia and non-indicia labels according to another illustrative embodiment of the present application.

Referring to FIG. 7 is a flow chart showing a process 700 for printing indicia and non-indicia labels according to the illustrative embodiment of the present application shown in FIGS. 3A and 3B. In step 710, the dedicated indicia thermal printing system processor begins a label print routine. In step 720, the processor determines whether an indicia label is to be printed. If so, the processor prints a normal indicia in step 730 and then ends the print label routine. If a non-indicia label is to be printed, the process proceeds to step 740 to print the non-indicia label image/text and the fluorescent quench strip in the same location as the fluorescent strip. The process then concludes the print label routine.

Figure 8:
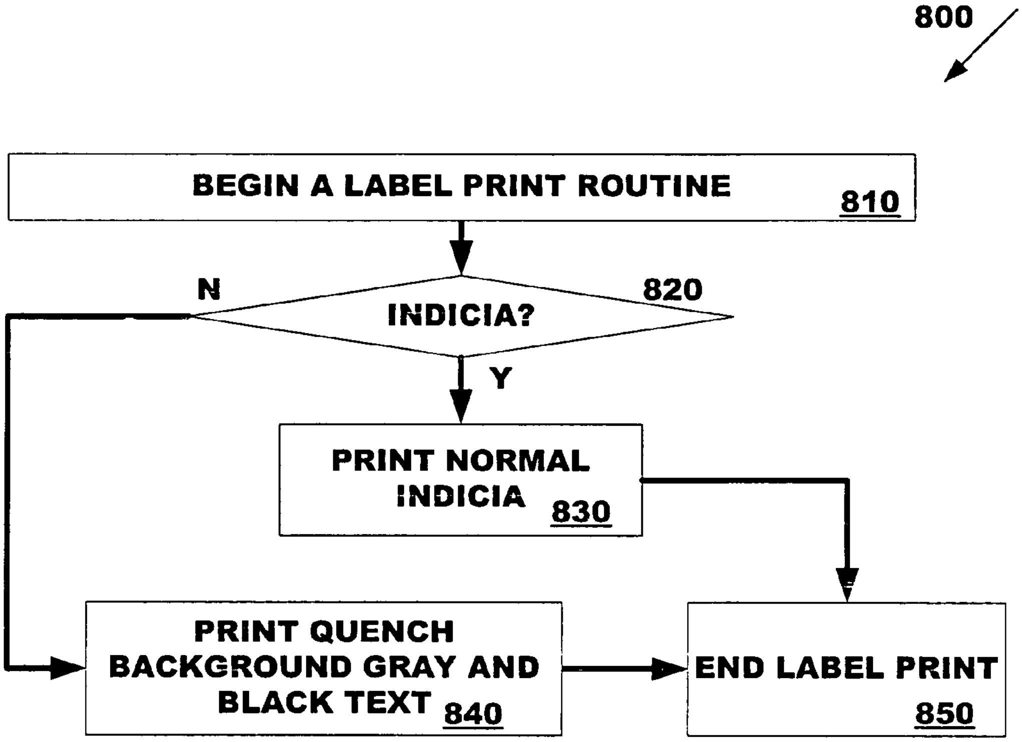
FIG. 8 is a flow chart showing a process for printing indicia and non-indicia labels according to yet another illustrative embodiment of the present application.

Referring to FIG. 8 is a flow chart showing a process 800 for printing indicia and non-indicia labels according to the illustrative embodiment of the present application shown in FIGS. 5A and 5B. In step 810, the dedicated indicia thermal printing system processor begins a label print routine. In step 820, the processor determines whether an indicia label is to be printed. If so, the processor prints a normal indicia in step 830 and then ends the print label routine. If a non-indicia label is to be printed, the process proceeds to step 840 to print the gray quench background and black address label text. The process then concludes the print label routine. The energy required to quench the fluorescence is tailored based upon the initial fluorescence, thermal sensitivity of the paper, and the energy supplied by the thermal printer. For a representative printer and paper, a black text over 50% gray suffices to quench the fluorescence.

In another alternative embodiment, the labels of FIG. 5B may alternatively be quenched by printing an address in reverse thereby printing white on a very dark background. Such a system will provide excellent contrast, but may not provide optimal performance of the thermal printer.

The present application describes illustrative embodiments of thermal media labels and systems and methods for providing selective signaling. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

What is claimed is:

1. A multiple-intensity direct thermal polypropylene label comprising:

a main section forming a blank label section on the multiple-intensity direct thermal label; and a removable signal section on the multiple-intensity direct thermal label having a luminescent coating, wherein the removable signal section includes a human readable text message, and wherein the multiple-intensity direct thermal label includes at least one perforation and the removable signal section is removable along the at least one perforation.

2. The thermal label of claim 1, wherein:

the signal section is a fluorescent signal section including an invisible red fluorescent ink sufficient fluorescent coating to trigger a facer/canceller system.

3. The thermal label of claim 2, wherein:

the signal section is printed in black.

4. The thermal label of claim 3, further comprising:

an address label.

5. The thermal label of claim 1, wherein:

the human readable text message provides instruction to remove the signal section.

6. The thermal label of claim 1, further comprising:

a message on the signaling section indicating that it is removable.

7. The thermal label of claim 6, wherein:

the label has a top portion including the signal section; and the top portion is approximately 20% of the width of the label.

8. The thermal label of claim 1, further comprising:

a postage indicium.

9. The thermal label of claim 1, wherein:

the multiple-intensity direct thermal label is approximately 2.6 inches long.

10. The thermal label of claim 9, wherein:

the multiple-intensity direct thermal label comprises two lengthwise sections each approximately 1.3 inches long.

11. The thermal label of claim 10, wherein:

the two lengthwise sections are separable using a perforation.

12. A multiple-intensity direct thermal label comprising:

a main section forming a blank label section on the multiple-intensity direct thermal label;

a signal section having a luminescent coating entirely covering the blank label section; and a background gray quench pattern direct-thermally printed using a first intensity in the area of the signal section.

13. The thermal label of claim 12, wherein:

the signal section is a fluorescent signal section comprising sufficient fluorescent luminescent coating to trigger a facer/canceller system.

14. The thermal label of claim 13, further comprising:

a non-indicia print portion in contrast to the background gray quench pattern printed using a second intensity, wherein the second intensity provides a darker marking than the first intensity thereby providing adequate contrast to render the non-indicia print portion readable.

15. The thermal label of claim 14, wherein:

the non-indicia print portion is an address printed in black.

16. The thermal label of claim 12, wherein:

the background gray quench pattern is thermally printed with an intensity for each pixel set at approximately 50% gray level.

17. A multiple-intensity direct thermal label suitable for use as a postal indicium label comprising:

a main section forming a blank label section on the multiple-intensity direct thermal label; and a removable signal section on the multiple-intensity direct thermal label comprising a fluorescent coating, wherein the removable signal section comprises sufficient invisible red fluorescent coating to trigger a facer/canceller system.

18. The thermal label of claim 17, wherein:

the multiple-intensity direct thermal label comprises a perforation for removing the signal section.

* * * * *